United States Patent Office 3,715,311
Patented Feb. 6, 1973

3,715,311
HYDROCARBON FUEL AND LUBRICATING OIL SOLUTIONS OF TRIALKYL PHOSPHITE-LONG CHAIN ALKENYLSUCCINIC ANHYDRIDE REACTION PRODUCT
William T. Brannen, West Lake, Ohio, assignor to Standard Oil Company, Chicago, Ill.
No Drawing. Original application May 8, 1969, Ser. No. 823,176. Divided and this application June 30, 1971, Ser. No. 158,635
Int. Cl. C10m 1/46
U.S. Cl. 252—49.8                    5 Claims

ABSTRACT OF THE DISCLOSURE

Trialkyl phosphites, e.g. tributyl phosphite, are reacted with alkenyl hydrocarbon-substituted succinic anhydrides, in which the alkenyl hydrocarbon contains at least 30 carbon atoms, to obtain reaction products which are useful as additives in hydrocarbon fuels and in lubricating oils.

---

This application is a division of copending application Ser. No. 823,176, filed May 8, 1969, which is now U.S. Pat. No. 3,657,397, dated April 18, 1972.

BACKGROUND OF THE INVENTION

The reaction between trialkyl phosphites and simple anhydrides in the presence of an acid catalyst, e.g. acetic acid, has been reported by G. Kamai and V. A. Kukhtin in Dokland Akad. Navk. SSSR 102, 283 (1955). Literature reports indicate that such reactions yield essentially α-ketophosphonates which are hydrolyticly unstable. Such products are therefore unsuitable as addition agents for hydrocarbon fuels and/or lubricants. It is therefore an object of the present invention to obtain hydrolyticly stable reaction products of trialkyl phosphites and anhydrides which are suitable for use as additives for fuels and lubricants.

SUMMARY OF THE INVENTION

The new compositions of the present invention are prepared by reacting in the absence of an acid catalyst, e.g. acetic acid, at reflux temperatures, for a period of from about 0.5 to about 10 hours preferably about 6 hours, an alkyl phosphite, having from 1 to about 16 carbon atoms in each alkyl group and an alkenyl hydrocarbon substituted succinic anhydride in which the alkenyl substituent contains at least 30 carbon atoms, in mole ratios of from about 1:2 to 2:1; removing unreacted alkyl phosphite from the reaction mass by suitable means, e.g. vacuum stripping, and filtering to recover the desired reaction product.

The alkenyl hydrocarbon-substituted succinic anhydride reactant is readily obtained by reacting maleic anhydride with a polymer of mono-olefins or iso mono-olefins, or mixtures thereof, having from 2 to about 12 carbon atoms, preferably from 2 to about 5 carbon atoms, such polymers having at least 30 carbon atoms, and molecular weights in the range of from about 400 to about 100,000. The polymers may be homopolymers or interpolymers of such mono-olefins. Chloronated derivatives of such polymers may also be reacted with maleic anhydride. Other high molecular weight aliphatic, or, substantially aliphatic hydrocarbons, both naturally occurring or synthesized can also be reacted with the maleic anhydride. Methods of preparing the polymers are well known to the art. A suitable polymer can be obtained by polymerizing in the liquid phase a hydrocarbon mixture containing butenes and isobutene together with the butenes and some $C_3$ and $C_5$ hydrocarbons at temperatures between about 0° F. and 30° F. in the presence of a Friedel-Crafts catalyst, e.g. $AlCl_3$.

The alkyl phosphite reactant has the general formula $P(OR)_3$ in which the R is an alkyl group containing from 1 to about 16 carbon atoms. The alkyl groups may be the same or different alkyl radicals. Examples of such alkyl phosphites are: tributyl phosphite; triethyl phosphite; triamyl phosphite; trinonyl phosphite; tridodecyl phosphite; tricetyl phosphite; ethyl dibutyl phosphite, dipropyl butyl phosphite; diethyl amyl phosphite; dibutyl hexyl phosphite; diamyl dodecyl phosphite; etc..

The reaction products of the present invention differ from the reaction products obtained by the similar reaction of trialkyl phosphites and simple anhydrides as reported by G. Kamai and V. A. Kukhtin, supra. The literature reports indicate that the reaction of the trialkyl and simple anhydrides yield α-ketophosphonates. However, the reaction of trialkyl phosphites and the polymeric succinic anhydride of the present invention yields primarily pseudo ester phosphonates which differ greatly from the known α-ketophosphonates; as indicated by the following major differences between the two:

Pseudo-ester phosphonates (1) Stable in cold caustic, retaining phosphorus content.
(2) One major carbonyl band in infrared at 5.76.

α-Ketophosphonates (1) Unstable in cold caustic, losing all phosphorous from the organic portion.
(2) Two major carbonyl bands in infrared at 5.76 and 5.86.

The hydrolytic stability of the pseudo-ester phosphonate is advantageous for the use of such products as additives in hydrocarbon fuels and lubricating oil compositions as anti-wear agents and as EP agents. Such reaction products are useful as anti-wear and EP agents in amounts of from about 0.01% to about 20% in hydrocarbon fuels, e.g. gasoline, and in lubricant compositions including lubricating oils and lubricant greases. The lubricating oil can be any normally liquid lubricant such as, for example, mineral oils, synthetic hydrocarbon lubricating oils, high molecular weight esters of carboxylic acids, silicone oils within the lubricating oil range, etc. Lubricating oils are usually within the viscosity range of from about 80 SSU at 100° F. to about 300 SSU at 210° F. Fuel and lubricant compositions containing the reaction products of this invention may also contain other well-known additives, such as corrosion inhibitors, detergents, sludge inhibitors, anti-knock agents, V.I. improvers etc.

PREFERRED EMBODIMENTS

The following examples illustrate the preferred embodiments of this invention:

EXAMPLE I 250 grams of a polybutenyl succinic anhydride (prepared by reacting maleic anhydride with a polybutene having a molecular weight of 450) and 250 grams of tributyl phosphite were refluxed for 6 hours. The unreacted tributyl phosphite was removed by vacuum stripping, and the product then filtered. The recovered filtrate had a phosphorus content of 7.24%.

EXAMPLE II 250 grams of a polybutenyl succinic anhydride (prepared by reacting maleic anhydride with a polybutene having a molecular weight of 800) and 62.5 grams of tributyl phosphite were refluxed for 6 hours. The unreacted tributyl phosphite was removed by vacuum stripping, and the product filtered. The recover filtrate had a phosphorus content of 2.43%.

Samples of a lubricating oil containing the products of Examples I and II and the polybutenyl succinic anhydride use in Example II were subjected to the Falex Test. The following results were obtained:

| Sample No. | Additive | Falex test jaw load failure, pounds |
|---|---|---|
| A | 1% Example I | 4,000 |
| B | 5% Example I | [1] 4,500 |
| C | 5% Example II | 4,000 |
| D | 5% polybutenyl succinic anhydride of Example II. | 1,500 |

[1] No failure.

The above data demonstrate that the polymeric succinic anhydrides do not exhibit any anti-wear or EP properties by themselves.

Percentages given herein and in the appended claims are weight percentages unless otherwise stated.

While particular preferred embodiments of the invention have been described, it is to be understood that the invention is not limited thereto, but includes within its scope such modifications and variations as come within the spirit and scope of the appended claims.

The invention claimed is:

1. A solution comprising a major amount of a liquid hydrocarbon fuel or lubricating oil and 0.01 to 20% of the product of reacting in the absence of acid catalyst at reflux temperature a trialkyl phosphite having from 1 to 16 carbon atoms in each alkyl group, and an alkenyl hydrocarbon-substituted succinic anhydride wherein the alkenyl-substituent has a molecular weight in the range of 400–100,000 in the respective reactant mole ratios of from about 1:2 to about 2:1.

2. The solution of claim 1 wherein the alkenyl-substituent is polybutenyl.

3. The solution of claim 2 wherein the polybutenyl-substituent has a molecular weight of from about 450 to about 800.

4. The solution of claim 3 wherein the trialkyl phosphite reactant is tributyl phosphite.

5. The solution of claim 3 wherein the trialkyl phosphite reactant is triethyl phosphite.

References Cited
UNITED STATES PATENTS

| | | | |
|---|---|---|---|
| 3,325,567 | 6/1967 | Le Suer | 252—49.8 X |
| 3,284,354 | 11/1966 | Tunkel et al. | 44—Dig. 4 X |
| 3,324,032 | 6/1967 | O'Halloran | 44—Dig. 4 X |

DANIEL E. WYMAN, Primary Examiner

W. H. CANNON, Assistant Examiner

U.S. Cl. X.R.

44—76, Dig. 4